US007113476B2

(12) United States Patent
Tulino

(10) Patent No.: US 7,113,476 B2
(45) Date of Patent: Sep. 26, 2006

(54) INTERFERENCE CANCELLATION METHOD AND RECEIVER

(75) Inventor: Antonia Maria Tulino, Sparone (IT)

(73) Assignee: Nokia Networks Oy, Espoo (FI)

( * ) Notice: Subject to any disclaimer, the term of this patent is extended or adjusted under 35 U.S.C. 154(b) by 989 days.

(21) Appl. No.: 09/971,770

(22) Filed: Oct. 9, 2001

(65) Prior Publication Data

US 2002/0196765 A1    Dec. 26, 2002

Related U.S. Application Data

(63) Continuation of application No. PCT/FI01/00115, filed on Feb. 8, 2001.

(30) Foreign Application Priority Data

Feb. 10, 2000    (FI) .................................. 20000284

(51) Int. Cl.
    *H04J 11/00* (2006.01)
    *H03K 5/01* (2006.01)
(52) U.S. Cl. ...................................... 370/203; 375/346
(58) Field of Classification Search .................... None
    See application file for complete search history.

(56) References Cited

U.S. PATENT DOCUMENTS

| | | | | |
|---|---|---|---|---|
| 4,613,978 A | * | 9/1986 | Kurth et al. | 375/346 |
| 5,671,247 A | * | 9/1997 | Souissi et al. | 375/144 |
| 5,719,899 A | | 2/1998 | Thielecke et al. | |
| 5,978,413 A | | 11/1999 | Bender | |
| 6,178,158 B1 | * | 1/2001 | Suzuki et al. | 370/203 |
| 6,240,122 B1 | * | 5/2001 | Miyashita | 375/130 |
| 6,473,417 B1 | * | 10/2002 | Herzog | 370/342 |

FOREIGN PATENT DOCUMENTS

WO    WO 98/18210    4/1998

OTHER PUBLICATIONS

Tulino et al., "Iterative Interference Suppression and Decoding in DS/FH Spread-Spectrum Systems," IEEE Transaction on Communications, vol. E83-B, No. 8, Aug 2000, pp. 1591-1601.
Subbaram et al., "Interference Suppression Via Orthogonal Projections: A Performance Analysis," IEEE Transactions of Antennas and Propagation, vol. 41, No. 9, Sep. 1993, pp. 1187-1194.

(Continued)

*Primary Examiner*—Ruy D. Vu
*Assistant Examiner*—Toan Nguyen
(74) *Attorney, Agent, or Firm*—Pillsbury Winthrop Shaw Pittman LLP

(57) ABSTRACT

The invention relates to an interference cancellation method and a receiver including interference canceller for suppressing a narrow-band interference signal from a received signal, converter for performing an orthonormal conversion of the signal into subspace components of a desired subspace, a decoder connected operationally to the output of the interference canceller, in which decoder an estimate for the received signal is obtained. The output of the decoder is operationally connected to the interference canceller, and the converter is arranged to determine an estimate for narrow-band interference properties, in which determination the estimate obtained from the output of the decoder is subtracted from the received signal before the orthonormal conversion is performed. By using the determined estimate, the interference canceller is arranged to reduce effect of the subspace components including narrow-band interference signals from the received signal.

6 Claims, 6 Drawing Sheets

OTHER PUBLICATIONS

Fathallah, et al., "A Subspace Approach to Adaptive Narrow-Band Inteference Suppression in DSSS," IEEE Transaction on Communications, vol. 45, No. 12, Dec. 1997, pp. 1575-1585.

Lops et al., "Automatic Suppression of Narrow-Band Interference inDirect-Sequence Spread-Spectrum Systems," IEEE Transactions on Communication, vol. 47, No. 8, Aug. 1999, pp. 1133-1136.

Sandberg, "Adapted Demodulation for Spread-Spectrum Receivers which Employ Transform-Domain Interference Excision," IEEE Transactions on Communications, vol. 43, No. 9, Sep. 1995, pp. 2502-2510.

Robertson, "Illuminating the Structure of Code and Decoder of Parallel Concatenated Recursive Systematic (Turbo) Codes," Proc. Globecom '94, Dec. 1996, pp. 1298-1303.

Feng et al., :A List Bidirectional Soft Output Decoder of Turbo Codes, International Symposium on Turbo Codes, Brest France, 1997, pp. 288-292.

Wax et al., "Detection of Signals by Information Theoretic Criteria," IEEE Transactions on Acoustics, Speech and Signal Processing, vol. ASSP 33, No. 2, Apr. 1985, pp. 387-392.

\* cited by examiner

INTERFERENCE CANCELLATION METHOD AND RECEIVER

This is a Continuation of PCT Application No. PCT/FI01/00115 which was filed on Feb. 8, 2001, which designated the U.S.

FIELD OF THE INVENTION

The invention relates to a receiver and a method of suppressing a narrow-band interference from a wide-band signal.

BACKGROUND OF THE INVENTION

Telecommunication connections are subject to various interferences. There are several reasons for interference. In telecommunication connections, the transmission path used for transmitting signals is known to cause interference to telecommunication. This occurs regardless of the physical form of the transmission path; whether the transmission path is, for instance, a radio link, an optical fibre or a copper cable. Particularly in radio telecommunication there are frequently situations where the quality of the transmission path varies from one connection to another and also during a connection.

Radio path fading is a typical phenomenon that causes changes in a transmission channel. Other simultaneous connections may also cause interferences and they can vary as a function of time and place.

To reduce effects of various interferences, several solutions have been evolved. This is the case in radio communication in particular. Various telecommunication methods have been evolved, aiming at achieving as high spectral efficiency as possible and still minimising the effect of interference. A wireless telecommunication method which has been very much studied lately is a wide-band spread-spectrum multiple access method CDMA (Code Division Multiple Access).

Compared to multiple access methods that were generally used earlier, the CDMA has a plurality of advantages. In a CDMA method, a narrow-band data signal of the user is multiplied by a spreading code having a considerably wider band to a relatively wide band. Bandwidths used in known experimental systems include 1.25 MHz, 10 MHz and 25 MHz. In the multiplying process, the data signal spreads to the entire band used. All users transmit simultaneously by using the same frequency band. Each connection between a base station and a mobile station uses its own spreading code, and the signals of the users can be distinguished from each other in the receivers on the basis of the spreading code of each user. The aim is to select the spreading codes so that they are mutually orthogonal, i.e. they do not correlate with each other. The above described CDMA method is called a direct-sequence method, DS-CDMA (Direct Sequence CDMA). There are other CDMA methods as well, such as a frequency hopping method FH-CDMA (Frequency Hopping CDMA), in which the frequency used is varied quickly according to the used spreading code. A combination of these methods is also possible.

A problem of wide-band data transmission is narrow-band interference, which is typically caused by narrow-band signal sources external to the system, using the same or overlaying frequency band with the system. Typical of these interference signals is that their properties and structure often differ from the signals of the system considerably. They often use a lower data transmission rate. Also, it is often so that the properties of interfering signals are not known in advance.

The CDMA can, to some extent, inherently compensate the effect of narrow-band interference on wide-band data transmission, but if the interfering signal is much stronger than the wide-band signal, it may cause considerable interference.

To suppress narrow-band interference from a wide-band signal, various methods have been evolved. The publication S. Sandberg, "Adapted Demodulation for Spread Spectrum Receivers which Employ Transform-Domain Interference Rejection", IEEE Trans. On Communications, Vol. 43, pp 2502–2510, September 1995, discloses a method in which the problem is approached in the frequency domain, and the interference is suppressed by removing the frequencies where the interference is assumed to be. In the presented solution, however, the location of the interference in the frequency band and the bandwidth of the interference are assumed to be known. The interference is also assumed to be stationary.

The publication M. Lops, A. Tulino, "Automatic Suppression of Narrowband Interference in Direct Sequency Spread-Spectrum Systems", IEEE Trans. On Communications, Vol. 47, pp. 1133–1136, August 1999, discloses a method in which non-stationary interference, the properties of which are not known, can be suppressed. However, the achieved results are not qualitatively satisfactory.

BRIEF DESCRIPTION OF THE INVENTION

It is an object of the invention to implement an improved method and equipment implementing the method for interference cancellation. This is achieved by a method of suppressing narrow-band interference from a wide-band signal, wherein a signal is received, an orthonormal conversion of the signal into subspace components of a desired subspace is performed, the converted signal is decoded with a decoder, whereby an estimate for the received signal is obtained, and when an estimate for narrow-band interference properties is determined, the estimate obtained from an output of the decoder is subtracted from the received signal before the orthonormal conversion is performed, and, by means of the determined estimate, effect of the subspace components comprising narrow-band interference signals is reduced in the received signal.

The invention also relates to a receiver comprising interference cancellation means for suppressing a narrow-band interference signal from a received signal, means for performing an orthonormal conversion of the signal into subspace components of a desired subspace, a decoder connected operationally to the output of the interference suppression means, in which decoder an estimate for the received signal is obtained. In the receiver of the invention, the output of the decoder is operationally connected to the interference suppression means, and the conversion means are arranged to determine an estimate for narrow-band interference properties, in which determination the estimate obtained from the output of the decoder is subtracted from the received signal before the orthonormal conversion is performed, and by using the determined estimate, the interference cancellation means are arranged to reduce effect of the subspace components comprising narrow-band interference signals in the received signal.

The preferred embodiments of the invention are disclosed in the dependent claims.

The invention is based on projecting the received signal onto an orthonormal subspace. A desired signal has a projection deviating from zero onto most orthonormal bases, whereas narrow-band interference has concentrated on specific directions. By suitably selecting the orthonormal base and the projection to be performed, the interference can thus be reduced or suppressed in its entirety. By subtracting the preliminary estimate of the desired signal from the received signal, the subspace components on which the interference concentrates can be estimated better than before. Thus, the projection onto the orthonormal components orthogonal to the interference can be performed better than before. The method can be repeated iteratively many times.

BRIEF DESCRIPTION OF THE FIGURES

In the following the invention will be described in greater detail in connection with the preferred embodiments, with reference to the attached drawings, in which.

DESCRIPTION OF THE PREFERRED EMBODIMENTS OF THE INVENTION

Preferred embodiments of the invention can be applied in telecommunication systems where a desired signal is transmitted and received as a wide-band one. Such a telecommunication system is a wide-band CDMA radio system, for instance. In the following example, preferred embodiments of the invention will be described in a universal mobile telephone system employing a wide-band code-division multiple access method, yet without restricting the invention thereto.

Figure 1:
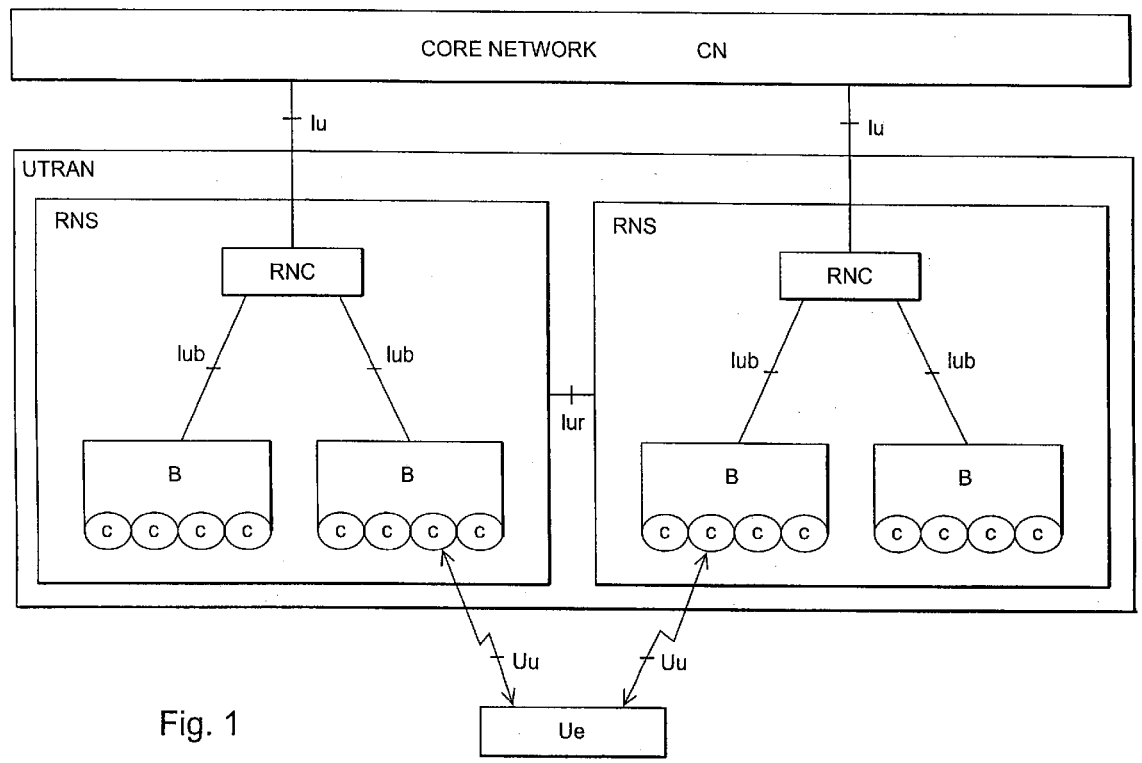
FIG. 1 shows an example of a system according to an embodiment of the invention.

With reference to FIG. 1, a structure of a mobile telephone system is explained by way of example. The main parts of the mobile telephone system are core network CN, terrestrial radio access network of the mobile telephone system UTRAN (UMTS terrestrial radio access network) and user equipment UE. The interface between the CN and the UTRAN is called Iu and the air interface between the UTRAN and the UE is called Uu.

The UTRAN comprises radio network subsystems RNS. The interface between the RNSs is called Iur. The RNS comprises a radio network controller RNC and one or more nodes B. The interface between the RNC and B is called Iub. The coverage area, or cell, of the node B is marked with C in the figure.

Figure 2:
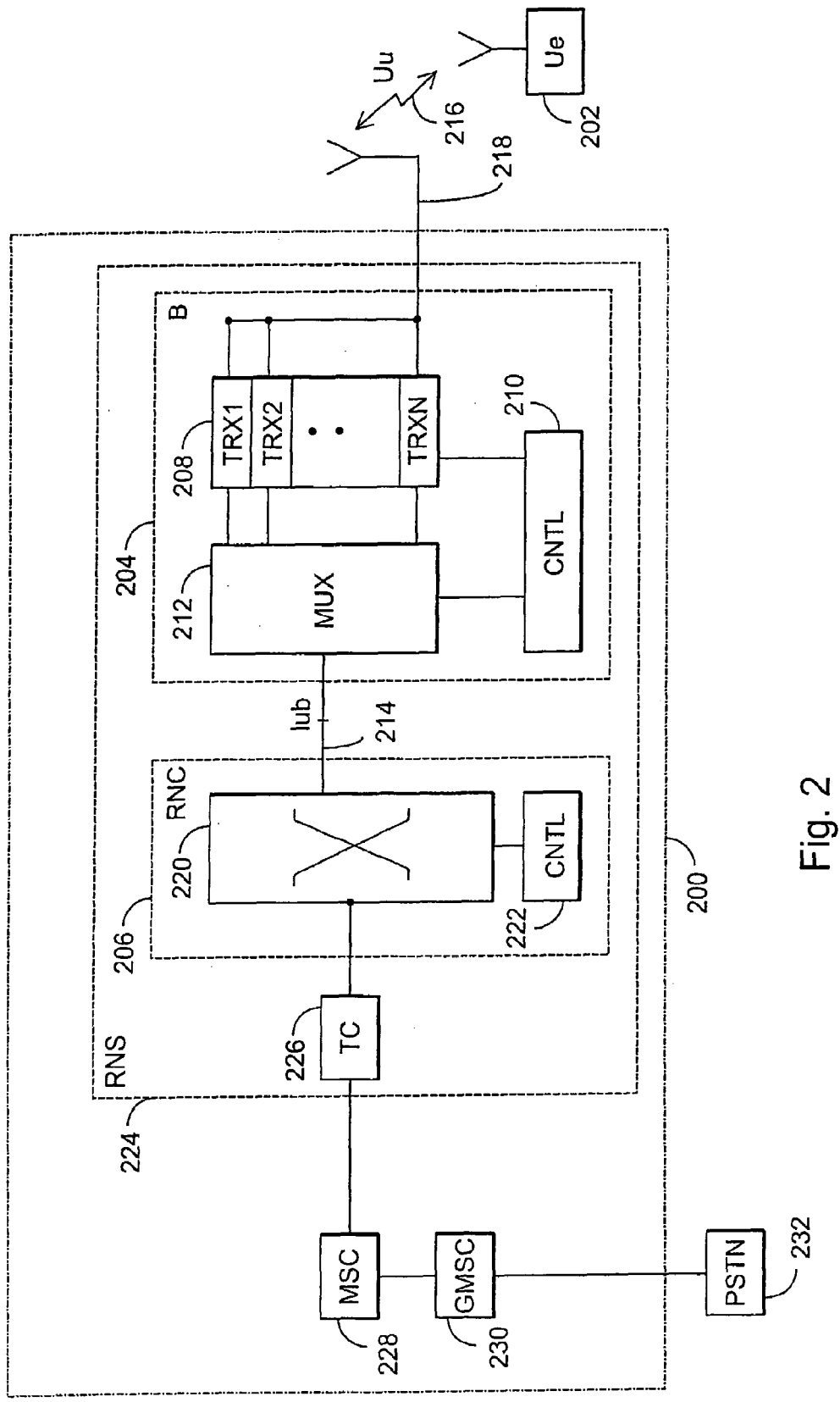
FIG. 2 shows a second example of a system according to an embodiment of the invention.

The description of FIG. 1 is relatively general, and so it is clarified with a more specific example of a cellular radio system shown in FIG. 2. FIG. 2 only includes the most essential blocks, but it is obvious to a person skilled in the art that the conventional cellular radio network also includes other functions and structures, which need not be further explained herein. It is also to be noted that FIG. 2 only shows one exemplified structure. In systems according to the invention, details can be different from what are shown in FIG. 2, but as to the invention, these differences are not relevant.

A cellular radio network thus typically comprises a fixed network infrastructure, i.e. a network part 200, and user equipment 202, which may be fixedly located, vehicle-mounted or portable terminals. The network part 200 comprises base stations 204. A base station corresponds to the node B shown in the previous figure. A plural number of base stations 204 are, in turn, controlled in a centralised manner by a radio network controller 206 communicating with them. The base station 204 comprises transceivers 408 and a multiplexer unit 212.

The base station 204 further comprises a control unit 210 which controls the operation of the transceivers 208 and the multiplexer 212. The multiplexer 212 arranges the traffic and control channels used by several transceivers 208 to a single transmission connection 214. The transmission connection 214 forms an interface Iub.

The transceivers 208 of the base station 204 are connected to an antenna unit 218 which is used for implementing a bi-directional radio connection 216 to the user equipment 202. The structure of the frames to be transmitted in the bi-directional radio connection 216 is defined separately in each system, the connection being referred to as an air interface Uu.

The radio network controller 206 comprises a group switching field 220 and a control unit 222. The group switching field 220 is used for connecting speech and data and for combining signalling circuits. The base station 204 and the radio network controller 206 form a radio network subsystem 224 which further comprises a transcoder 226. The transcoder 226 is usually located as close to a mobile services switching centre 228 as possible, because speech can then be transferred in a cellular radio network form between the transcoder 226 and the radio network controller 206, which saves transmission capacity.

The transcoder 226 converts different digital speech coding forms used between a public switched telephone network and a radio network to make them compatible, for instance from a fixed network form to another cellular radio network form, and vice versa. The control unit 222 performs call control, mobility management, collection of statistical data and signalling.

FIG. 2 further shows the mobile services switching centre 228 and a gateway mobile services switching centre 230 which controls the connections from the mobile communications system to the outside world, in this case to a public switched telephone network 232.

The solution according to the preferred embodiments of the invention can be applied to both a base station receiver and a user equipment receiver.

Figure 3:
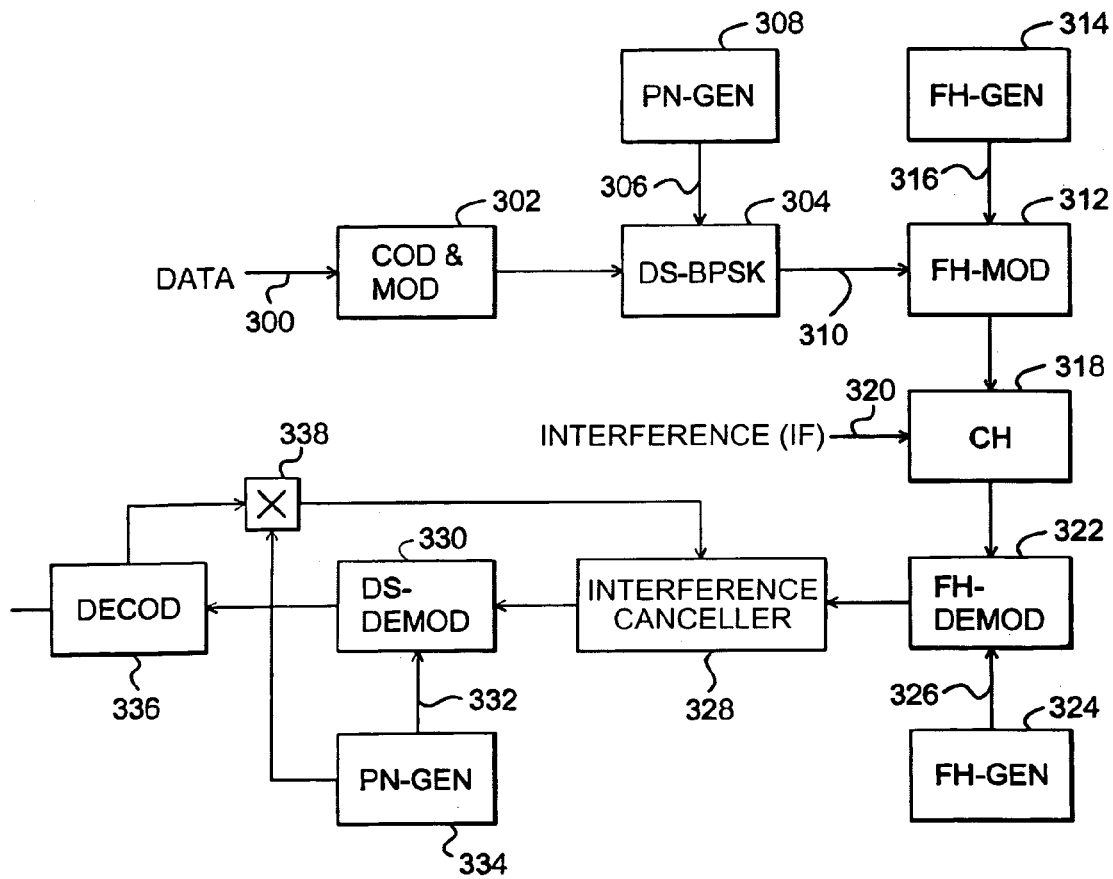
FIG. 3 illustrates a system model according to an embodiment of the invention.

Let us examine the example of a system model shown in FIG. 3. The model is somewhat simplified, and it does not include, for instance, radio frequency parts, antennas, chip pulse form scramblers and A/D converters at transmission and reception ends, which are typically used in radio systems. It is assumed in this example that the system uses both a frequency hopping (FH) technique and a direct-sequence (DS) technique. However, it is to be noted that the embodiments of the invention are not restricted to this combination. Let us assume that binary data flow d(k) 300 to be transmitted is coded by a turbo-coder 302 with a code rate 1/R by using $N_e$ parallel recursive systematic coders, each of which uses a code rate $1/R_e$ and which are separated from each other by interleavers. Code bits are mapped with a BPSK method, and the symbol length is $T_b$. Each data symbol b(kR+j), j=0, . . . , R−1 is then modulated in an DS-BPSK modulator 304 with a spreading code p(t) 306 which is generated in a spreading code generator 308. The complex envelope of a useful signal 310 before a FH modulator 310 is $$s_T(t) = \sum_{k=0}^{Q-1}\sum_{j=0}^{R-1} b(kR+j)p(t-kRT_b-(j-1)T_b)$$

$$= \sum_{k=0}^{Q-1}\sum_{j=0}^{R-1} b(kR+j)\sum_{i=0}^{N-1} c_i u_{T_c}(t-iT_c-kRNT_c-(j-1)NT_c),$$

where Q is the number of information bits per one frame, $[b(kR), b(kR+1), \ldots, b(kR+R-1)]=B_k$, where $k=0,\ldots,Q-1$ is the code word which is transmitted in the k:th information signalling time slot $RT_b$, $T_c$ is the chip time slot (i.e. the bit time slot of the spreading code), and which is proportioned to the signalling time slot $T_b$ such that $T_b=NT_c$, where N is processing gain. $c=[c_0,\ldots,c_{N-1}]^T$ is the spreading sequence and u(t) is defined as follows:

$$u(t) = \begin{cases} \frac{1}{\sqrt{T_c}}, & 0 \le t \le T_c \\ 0, & \text{elsewhere} \end{cases}$$

A DS signal 310 is modulated in the FH modulator 312 where frequency hops are generated according to a pseudo-random code 316 generated in the FH generator 314.

The signal is transmitted to a channel 318 where interference and noise 320 are added to the signal.

The signal that has passed through the channel is received in the receiver, amplified in the radio frequency parts and passed to the FH demodulator 322 where frequency hopping is decoded according to the pseudo-random code 326 generated in the FH generator 324.

Let us next examine the received signal in the output of the FH demodulator 322. Then the signal has the form $$r(t)=Ae^{j\Phi}s_T(t-\tau)+i(t)+w(t), \quad (1)$$

where $Ae^{j\Phi}$ is the complex gain caused by the channel effect, τ is the random delay caused by the channel and w(t) is thermal noise which can be modelled as a complex Gaussian process with a power spectral density $2N_0$. i(t), for its part, is the complex envelope of the narrow-band interference signal.

Let us assume that the delay τ of the desired signal is either known or it is estimated. Then, the desired signal can be expressed in the l=(k+j):th signalling time slot of the code bit as a vector in an N-dimensional subspace from those functions in the space $L^2[lT_b+\tau, (l+1)T_b+\tau[$ whose quadratic absolute value can be integrated over the duration of $T_b$. In the following, the marking $S_n(l)$ and the term signal space are used for this subspace.

When the received waveform (1) is projected onto the selected orthonormal base and the entire frame is observed, the following NRQ-dimensional observation vector is obtained:

$$r=[r^T(1),\ldots,r^T(l),\ldots,r^T(NRQ)]^T \quad (2)$$

$$r(l)=Ae^{j\Phi_b}(l)s+i(l)+w(l).$$

s, i ja w indicate N-dimensional vectors of the projections of the desired signal, interference and noise onto a suitable orthonormal base B of the signal space $S_n(l)$. s is proportional to spreading codes c. In the above, $(\ )^T$ refers to transpose.

An idea of the invention is that since the desired signal is of a spread-spectrum nature and the noise is uncorrelated, it is possible to find an orthonormal conversion, whereby the desired signal has spread evenly to all N components, whereas the narrow-band interference has concentrated on a subspace of the signal space, having small dimension. When a strong narrow-band interference has been received, some of the terms of r have an absolute value which is considerably higher than that of others and by which they can be separated from the others, and thus interference cancellation can be formed as a problem of finding these unknown components. When these components have been found, their effect can be reduced either by excising them to the desired level or by nullifying components. One embodiment is to include only those samples in further processing whose absolute value is below the given limit. This alternative is called type I censoring. Another embodiment is to nullify L samples having the highest absolute values, where L is the estimate of the subspace dimension. This alternative is called type II censoring.

From the output of the FH demodulator 322, the signal is thus passed to interference cancellation means 328 which perform the above described projection. After interference cancellation, DS-BPSK demodulation, i.e. the decomposition decoding 330 can be performed with a spreading code p(t) 332, which is generated in a spreading code generator 334. The decoded signal is passed to the turbo-decoder 336.

Another idea of the invention is that since the desired signal may also have components in the same direction as the narrow-band interference, a more accurate estimate for the interference is obtained, when the estimate of the desired signal is first subtracted from the received signal, whereby the signal to be processed is such that the portion of interference and noise can be detected more easily. The subspace components of the interference in this residual signal can be estimated more accurately. Thus, the signal is fed back from the turbo-decoder 336 to the interference cancellation 328. The estimated signal is multiplied by the spreading code in a multiplier 338, before it is taken to the interference cancellation.

Figure 4:
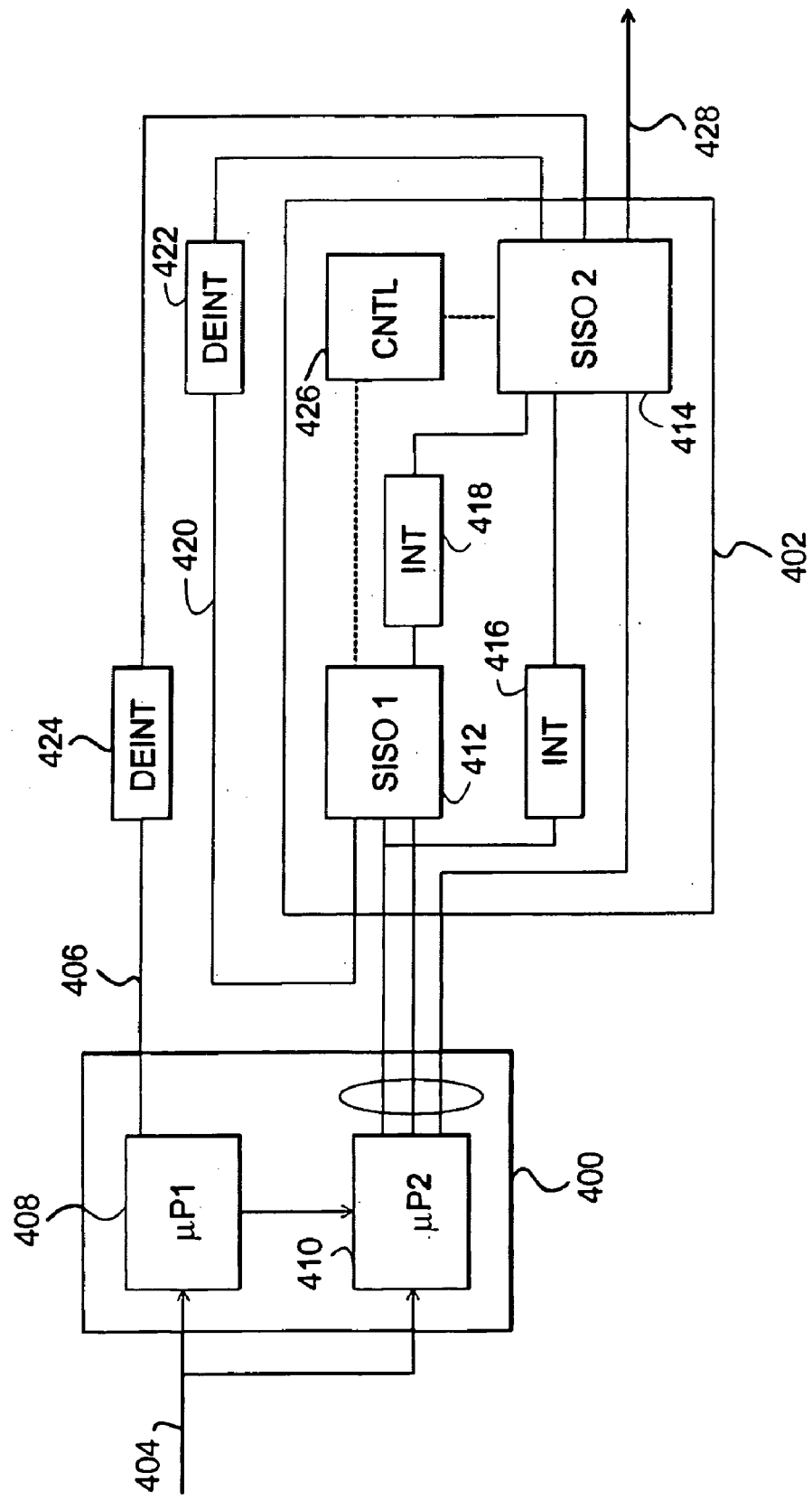
FIG. 4 illustrates a structure of a receiver according to an embodiment of the invention.

Let us examine an example of the implementation according to a preferred embodiment of the invention by means of FIG. 4. The figure shows two blocks, an interference cancellation block 400 and a decoder block 402. In the preferred embodiment of the invention, the decoder block is implemented as a turbo-decoder. A decoder block of another type is possible, too. From the previous iteration round, the received signal r(l) 404 and the feedback soft decisions $\hat{b}^P$ 406 are supplied as input to the interference cancellation block from the output of the turbo-decoder 402. These soft decisions are subtracted from the received signal. Before the subtraction, they must first be multiplied by the spreading code into a direct-sequence spread-spectrum form. On each iteration round, the interference cancellation block first calculates an orthonormal conversion $U^P$, estimates the interference subspace $\hat{S}_I^P(l)$ (i.e. the main direction for $S_I(l)$), and finally projects the signal onto the subspace $\hat{S}_N^P(l)$ orthogonal to the interference subspace.

Let us examine the implementation of an orthonormal conversion a bit later. Let the term $Z^P(l)$ refer to the absolute value vector of the vector $\tilde{r}=[\tilde{r}^P(l),\ldots,\tilde{r}^P(l),\ldots,\tilde{r}^P(NRQ)]^T$, where $$\tilde{r}(l)=U^P(r(l)-Ae^{j\Phi}\hat{b}^P(l)s) \quad (3)$$

and let $z_r^P(l)$ refer to its ranked version, i.e.

$$z^P(l)=[z_0^P(l),\ldots,z_{N-1}^P(l)]^T=[|\tilde{r}_0^P(l)|,\ldots,|\tilde{r}_{N-1}^P(l)|]^T$$

$$z_r^P(l)=[z_{(1)}^P(l),\ldots,z_{(N)}^P(l)]^T,$$

where $z_{(i)}^P$ is the i:th grade statistics of $z^P(l)$, and $\hat{b}^P(l)$=sign $[R\{\tilde{L}^P(l)\}]$ is the hard estimate of the code bit when $\tilde{L}^P(l)$ is the soft output decoded from the interleaving of the turbo-decoder. According to formula (3), the estimate $\hat{b}^P(l)$ of the desired signal, multiplied by the spreading code s, is thus subtracted from the received signal r(l).

When L samples having the highest absolute values are nullified, we have a new data vector $v^P(l)$:

$$v^P(l)=G^P(l)U^P r(l),\qquad(4)$$

where the censoring matrix $G^P(l)$ is an N-dimensional quadratic diagonal matrix which depends on the received vector r(l) and is defined as follows:

$$\text{type I }G^P(l)_{i,i} = \begin{cases} 1, & \text{if } D_i(l) \geq z_{(i)}^P(l) \\ 0, & \text{if } D_i(l) < z_{(i)}^P(l) \end{cases} \qquad(5)$$

$$\text{type II }G^P(l)_{i,i} = \begin{cases} 1, & \text{if } z_{(N-L)}(l) \geq |\tilde{r}_i^P(l)| \\ 0, & \text{if } z_{(N-L)}(l) < |\tilde{r}_i^P(l)| \end{cases}$$

where $D_i(l)$ indicates the suitable threshold values and L is the estimate of the interference subspace $\hat{S}_I^P(l)$ dimension. The superscript OP indicates that the value of the term is from the previous iteration round. Type I and type II thus refer to the earlier mentioned censoring methods of suppressing interference. Naturally on the first iteration round, no estimation results of the previous iteration round are available, and then $\hat{b}^P=0$ can be used as initial values.

If the calculation needs to be made less complex, instead of soft decisions obtained from the decoder, hard decisions given by the decoder can also be used in calculating the censoring matrix $G^P(l)$. Then the censoring matrix is defined as follows:

$$G^P(l)_{i,i} = G^P\left(\left\lfloor \frac{l}{R} \right\rfloor\right), \forall l = 0,\ldots,QR-1, \qquad(6)$$

where $$G^P\left(\left\lfloor \frac{l}{R} \right\rfloor\right)$$

is in accordance with formula (5) and $\lfloor x \rfloor$ is the biggest integer, which is not bigger than x.

Let us next examine the selection of the parameters, such as D and L, which are to be used in the calculation. It is also essential for the calculation to define the base B of the orthonormal conversion. The interference cancellation is most effective, if the projection of a narrow-band interference signal in the signal space comprises a limited number of components deviating from zero. Therefore, the conversion base should be selected so that it focuses the narrow-band interference on a subspace in the signal space, having small dimension.

In a preferred embodiment of the invention, the covariance matrix of the vector $\tilde{r}^P(l)$ is estimated, where $\tilde{r}^P(l)$ is based on N-dimensional data vectors r=[r(0),...,r(RQ-1)], which are received during one frame, i.e.

$$\hat{M}_{\tilde{r}^P\tilde{r}^P}^P = \frac{1}{RQ}\sum_{i=0}^{RQ-1}\tilde{r}^{PH}(l)\tilde{r}^P(l) \qquad(7)$$

By using eigenvalue value decomposition EVD, the orthonormal conversion $U^P$ can be defined easily from the formula $$\hat{M}_{\tilde{r}^P\tilde{r}^P}^P=U^P\Delta^P U^{PH}.$$

where $\Delta$ denotes the singular value matrix. When this method is employed, on each iteration round a sample covariance matrix $\tilde{r}^P(l)$ has to be calculated and its eigenvalue decomposition has to be evaluated.

Another preferred embodiment of the invention utilizes the assumption of the interference having a narrow band, i.e. that its bandwidth is substantially smaller than the bandwidth of the desired signal. The Fourier base can thus be selected as a base, i.e.

$$\Psi_l(t) = \frac{1}{\sqrt{N}}\sum_{m=0}^{N-1}u_{T_c}(t-mT_c)\exp\left(-j\frac{2\pi ml}{N}\right), l=0,\ldots,N-1. \qquad(8)$$

In this case, the orthonormal conversion corresponds to an N-point DFT conversion of the signal sampled from the output of the pulse form scrambler. When the received signal is corrupted by interference with a few frequency peaks only, this solution is particularly advantageous.

In a preferred embodiment of the invention, it is also essential to determine the threshold values $D_i$ and the interference space dimension L mentioned in formula (5). If the eigenvalues obtained from formula (7) are evaluated and a suitable information criterion, such as so-called Akaik (AIC), the smallest description length or an eigenvalue threshold method, is used, the interference subspace $S_I(l)$ dimension can be estimated adaptively. These information criteria are prior art methods, and the smallest mapping length, for instance, is explained in the publication M. Wax, T. Kailath: "Detection of signals by information therorectic criteria", IEEE Trans. Acoust. Speech, Signal Processing, Vol. 33, pp. 387–392, 1985, which is incorporated herein as a reference. The parameter L can thus be set according to the dimension.

The threshold value $D_i$, for its part, can in principle be set so that it maximises the value $$Pr\{|\tilde{r}_m(l)|>D_m|i\neq 0\},$$

i.e. the detection probability, provided that the false alarm probability $$Pr\{|\tilde{r}_m(l)|>D_m|i=0\}$$

is fixed to a desired level. This maximisation can be calculated by means of a known likelihood test. This method requires, however, the dependence on the parameters of the interference signal, and it is not optimal. In a preferred embodiment of the invention, a more intuitive solution model is applied, where only the statistics of the term $|\tilde{r}_m(l)|$ is utilized and a situation free of interference is assumed.

When a threshold is set, it is essential to select them in such a manner that the signal is not censored unnecessarily when the interference is weak and yet so that the interference cancellation is ensured when the interference is strong. Let us assume that the eigenvalue $E[\hat{b}(l) w(l)|i=0]=0$; as a result, when the conditions of $\hat{b}(l)$ of $b(l)$ and when $i=0$ and when $|\tilde{r}_m|^2$ is the non-centralised variable of the $\chi^2$ distribution, having two degrees of freedom, then $$E\left[|\tilde{r}_m|^2|i=0\right] = A_0^2|s_m|^2 E\left[(1-\hat{b}(l))^2\right] + 2N_0$$

$$\mathrm{Var}\left[|\tilde{r}_m|^2|i=0\right] = 4N_0 + 4N_0 A_0^2 E\left[(1-\hat{b}(l))^2\right]|s_m|^2,$$

where $E\left[(1-\hat{b}(l))^2\right] =$ $$(2 - 2E[b(l)\hat{b}(l)]) = \left(2 - 2\mathrm{sign}[\tilde{\Lambda}^P(l)]\tanh\left[\frac{1}{2}[\tilde{\Lambda}^P(l)]\right]\right).$$

Let us examine the example of the implementation according to the preferred embodiment of the invention, which was already partly explained and shown in FIG. 4. The figure thus shows two blocks, the interference cancellation block 400 and the decoder block 402 which is preferably, but not necessarily, a turbo-decoder. From the previous iteration round, the received signal 404 and the feedback soft decisions 406 are supplied as input to the interference cancellation block 400 from the output of the turbo-decoder 402. On each iteration round, an upper calculating unit 408 of the interference cancellation block 400 first determines an estimate for the narrow-band interference properties by subtracting the estimate obtained from the output of the turbo-decoder from the received signal. Then an orthonormal conversion $U^P$ is calculated on the basis of formulas (7) or (8), for instance, and the interference subspace $\hat{S}_f^P(l)$ is estimated from the residual signal. Then the upper calculating unit defines the censoring matrix $G^P$ on the basis of formula (5), for instance.

The information on the orthonormal conversion and censoring matrix is transmitted to a lower calculating unit 410 where the actual censoring is performed and the new data vector $v^P(l)$ according to formula (4) is calculated. This data vector is passed to the turbo-decoder 402 as input.

Both calculating means 408, 410 of the interference cancellation block 400 can preferably be implemented programmatically by means of a processor and a suitable program or also as an ASIC circuit or by means of separate logic circuits. It is to be noted that the interference cancellation block can also be implemented by means of one or more calculating units and the implementation described herein is only an example, as is obvious to a person skilled in the art.

The turbo-decoder 402 comprises a SISO (soft-in soft-out) decoder. The turbo-decoder comprises two parallel-concatenated decoders 412, 414, between which interleaving 416, 418 is performed. The decoding is based on decoding the component codes alternately and transmitting so-called extrinsic information, which is a part of the soft output of the SISO decoder, to the next decoding stage. The signal can be iterated several times in the turbo-decoder by re-feeding the obtained estimates 420 to the decoder. The deinterleaving 422 of is performed therebetween. The output of the turbo-decoder is fed back 406 to the interference cancellation block, and the loop also includes the deinterleaving 424. The decoder can also comprise a control block 426 controlling the function of different parts of the decoder. If several iteration rounds are performed in the decoder, the control block 426 gives a command to stop the iteration and transmits the estimates further to the interference cancellation block. The estimates are also taken further to other parts 428 of the receiver. The iteration can also be controlled from outside the decoder at a higher level of the receiver.

On the P:th iteration round, the decoder makes a decision on the transmitted bits on the basis of the vector $v^P$, which has the form $$v^P = [v^{PT}(1), \ldots, v^{PT}(l), \ldots, v^{PT}(NRQ)]^T = G^P U^P r,$$

where $v^P(l)$ is obained from formula (4) and $G^P U^P$ is an NRQ-dimensional matrix which has the form $$G^P U^P = \mathrm{diag}(G^P(0)U^P, \ldots, G^P(RQ)U^P).$$

For the sake of clarity, the term $$\{\{Y_h^P(k)\}_{k=0}^{Q-1}\}_{h=0}^{N_e-1}$$

refers in the following to an $NR_e$-dimensional vector which has the form $$(k) = [v^{PT}(k), v^{PT}(k+hR_e+1), \ldots, v^{PT}(k+(h+1)R_e-1)]^T,$$

$$h=0, \ldots, N_e-1 \; k=0, \ldots, Q-1.$$

In the definition of the decoder, let us assume that there is no interference in the output of the decoder. There are two reasons for this: firstly, this ensures that if the censoring has been completely successful, the remaining samples can be processed optimally. Secondly, if the interference signal is weak, the loss that formula (5) has caused in the signal, compared to the conventional decoder processing the original received signal, is minimised.

The soft decision on the i:th Map decoder is obtained as a logarithm of the APT (a posteriori likelihood) ratio of each information bit $d_k=1$ compared to APT=0. Thus the soft decision has the form $$L_h^P(d_k) = \log \frac{\sum_m \sum_{m'} \gamma_1(Y_h^P(k), m'm)\alpha_{k-1}(m')\beta_k(m))}{\sum_m \sum_{m'} \gamma_0(Y_h^P(k), m'm)\alpha_{k-1}(m')\beta_k(m))}.$$

Forward and backward recursions of the Map decoder can be expressed as follows:

$$\alpha_k(m) = \mathrm{const}_\alpha \sum_{m'} \sum_{i=0}^{1} \gamma_i(Y_h^P(k), m', m)\alpha_{k-1}(m')$$

$$\beta_k(m) = \mathrm{const}_\beta \sum_{m'} \sum_{i=0}^{1} \gamma_i(Y_h^P(k), m', m)\beta_{k-1}(m')$$

where $\mathrm{const}_\alpha$ ja $\mathrm{const}_\beta$ are constants caused by normalisation. Transition probability $\gamma_i(\;)$, where $i=0, 1$, is, for its part, is obtained in the following manner:

$$\gamma_i(Y_h^P(k), m, m') = \mathrm{Prob}(Y_h^P(k)|d_k=i, S_k=m, S_{k-1}=m')$$
$$\mathrm{Prob}(d_k=i, S_k=m, |S_{k-1}=m').$$

Following the earlier mentioned publication of M. Lops and A. Tulino and its markings, the above mentioned formula for both type I and type II censoring can be expressed in the following form:

$$\gamma_i(Y_h^P(k), m, m') = Prob(d_k = i)Prob \quad (9)$$

$$(S_{k+1} = m' \mid S_k = m) \sum_{n=1}^{Q} g(|v_1|, \ldots, |v_N|, q = q^{(n)}) \times$$

$$\prod_{j=0}^{R-1} \exp \frac{\|(v^P(k+(h-1)R_e+j) - G^P(k+(h-1)R_e)UAe^{j\phi}s\|^2}{2N_0}$$

where $q^{(n)}$ is a variable having Q possible values representing the n:th censoring event where $Q=2^N$ for type I censoring and $Q=N!$ for type II censoring. It is to be noted that the term $g(|v_1|, \ldots, |v_N|, q=q^{(n)})$ does not depend on the code bit b(l) and is clearly a constant term, which is removed in the reliability calculation. The first term of formula (9), a priori information on the transmitted information bits, is a function of the external $L_{ext}$ information. A reference is herein made to the publication P. Robertson, Illuminating the Structure of Code and Decoder of Parallel Concatenated Recursive Systematic (Turbo) Codes, Proc. Globecomm '94, December 1996. As appears from the presented formula (9), in connection with the metric calculation, filtering adapted to the spreading code, i.e. DS decomposition decoding, is also performed. This is indicated by the term s in formula (9). In order to operate the presented LogMap algorithm requires the information on the signal-to-noise ratio. If the estimate of the signal-to-noise ratio is not available, a so-called SOVA algorithm known to a person skilled in the art can be applied. The publication W. Feng, B. Vucetic, A List Bidirectional Soft Output Decoder of Turbo Codes, International Symposium on Turbo Codes, Brest, France, 1997 is given as an example of this. The branch metric for both censoring types is as follows:

$$\lambda_h^P(d_k) = -2 \sum_{j=0}^{R-1} \Re\{Ae^{j\Phi}s^H U^{PH} v(k+(h-1)R_e+j)\}$$

where $(\ )^H$ refers to conjugate transpose.

Figure 5A:
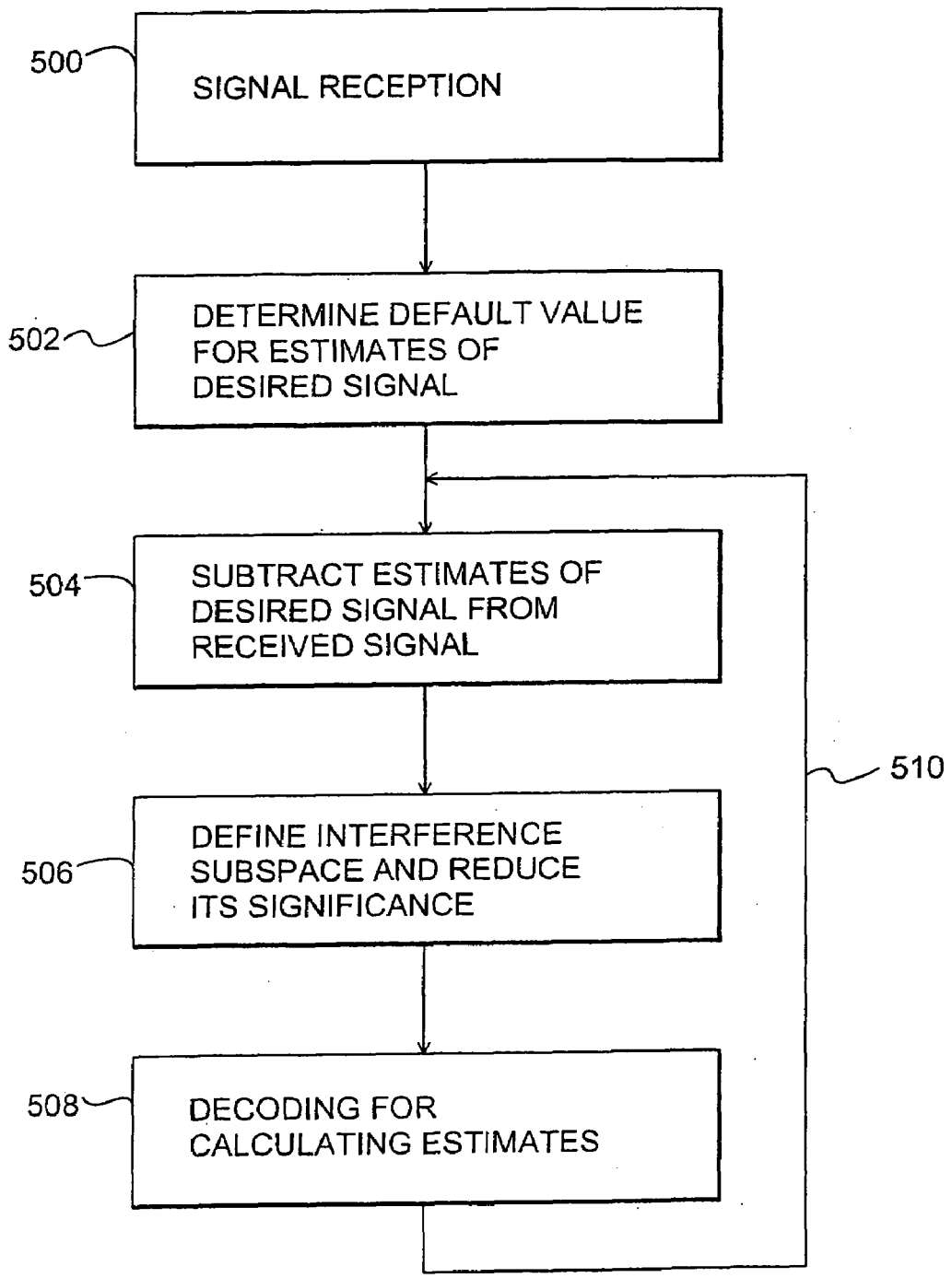
FIGS. 5a and 5b illustrate solutions according to preferred embodiments of the invention.
Figure 5B:
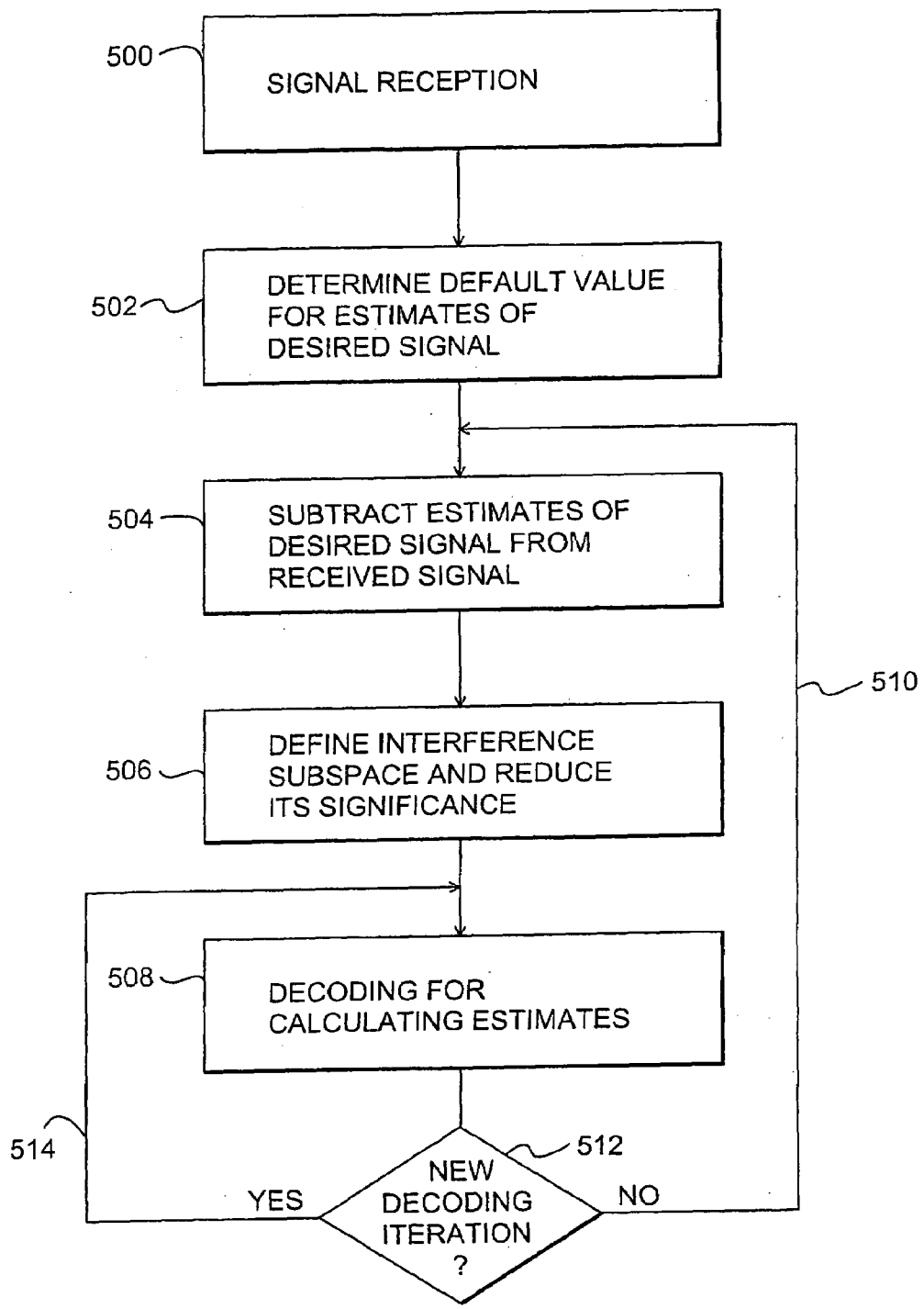

Let us examine an example of an embodiment of the invention by means of the flow chart of FIG. 5a. A signal is received in step 500. In step 502, a default value, for example 0, is determined for the estimates of the desired signal for the first round of the interference cancellation iteration. In step 504, the estimate is subtracted from the received signal. In step 506, an interference subspace is defined and its significance in the received signal is reduced. In step 508, turbo decoding is performed and the estimates for the desired signal are determined. These estimates are passed back to the interference cancellation 510.

Flow chart 5b shows another example. The chart is otherwise similar to the previous one, but after the turbo decoding, a decision is made in step 512, whether a new iteration is performed for the decoding. If not, the estimates 510 are passed to the interference cancellation, if yes, the estimates 514 are passed to the input of the decoder again.

Although the invention has been described above with reference to the examples according to the attached drawings, it is obvious that the invention is not restricted thereto, but may be modified in a variety of ways within the scope of the inventive idea disclosed in the attached claims.

The invention claimed is:

1. A method of suppressing narrow-band interference from a wide-band signal, comprising
    receiving a signal,
    performing an orthonormal conversion of the received signal into subspace components of a desired subspace,
    decoding the converted signal with a decoder, whereby an estimate for the received signal is obtained,
    determining an estimate for narrow-band interference properties by subtracting the estimate obtained from an output of the decoder from the received signal before performing the orthonormal conversion,
    reducing effect of the subspace components comprising narrow-band interference signals reduced in the received signal by means of the determined estimate; and
    excising the subspace components that are stronger than a given threshold from the received signal to a desired level to generate an interference suppressed signal.

2. The method as claimed in claim 1, the method further comprising suppressing the subspace components that comprise narrow-band interference signals from the received signal.

3. The method as claimed in claim 1, the method further comprising passing the interference suppressed signal to the decoder again, and performing interference cancellation as many times as desired.

4. The method as claimed in claim 1, the method further comprising passing the interference suppressed signal through the decoder several times before the output of the decoder is used in the interference cancellation.

5. A receiver comprising
    interference cancellation means for suppressing a narrow-band interference signal from a received signal,
    conversion means for performing an orthonormal conversion of the signal into subspace components of a desired subspace,
    a decoder connected operationally to the output of the interference suppression means, in which decoder an estimate for the received signal is obtained, the output of the decoder being operationally connected to the interference suppression means, wherein
    the conversion means are arranged to determine an estimate for narrow-band interference properties, in which determination the estimate obtained from the output of the decoder is subtracted from the received signal before the orthonormal conversion is performed, and
    by using the determined estimate, the interference cancellation means are arranged to reduce effect of the subspace components comprising narrow-band interference signals in the received signal,
    wherein the interference cancellation means are arranged to suppress the subspace components comprising narrow-band interference signals from the received signal, and wherein the interference cancellation means are arranged to excise the subspace components, which are stronger than a given threshold from the received signal to a desired level.

6. The receiver as claimed in claim 5, wherein the decoder is a turbo-decoder.

* * * * *